(12) United States Patent
Surnilla et al.

(10) Patent No.: US 7,918,086 B2
(45) Date of Patent: Apr. 5, 2011

(54) SYSTEM AND METHOD FOR DETERMINING A $NO_x$ STORAGE CAPACITY OF CATALYTIC DEVICE

(75) Inventors: Gopichandra Surnilla, West Bloomfield, MI (US); Christian T. Goralski, Jr., St. Paul, MN (US); Joseph E. Patterson, Dearborn, MI (US); Joseph R. Theis, Rockwood, MI (US); Shane Elwart, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1562 days.

(21) Appl. No.: 11/254,287

(22) Filed: Oct. 19, 2005

(65) Prior Publication Data

US 2007/0084195 A1 Apr. 19, 2007

(51) Int. Cl.
*F01N 3/00* (2006.01)

(52) U.S. Cl. .............. 60/295; 60/274; 60/277; 60/301
(58) Field of Classification Search ............ 60/274, 60/276, 277, 295, 299, 301
See application file for complete search history.

(56) References Cited

U.S. PATENT DOCUMENTS 5,722,238 A * 3/1998 Tanahashi et al. ............. 60/276
6,823,843 B1 11/2004 Goralski, Jr. et al.

* cited by examiner

*Primary Examiner* — Thomas E Denion
*Assistant Examiner* — Diem Tran
(74) *Attorney, Agent, or Firm* — Julia Voutyras; Alleman Hall McCoy Russell & Tuttle LLP (57) ABSTRACT

Performance characteristics of a catalytic device are determined based on a particle size of a particulate component of the catalytic device. In this way, aging of a catalytic device can be accounted for in the calculation of performance characteristics.

11 Claims, 9 Drawing Sheets

SYSTEM AND METHOD FOR DETERMINING A $NO_x$ STORAGE CAPACITY OF CATALYTIC DEVICE

TECHNICAL FIELD

The present application relates to the field of automotive emission control systems and methods.

BACKGROUND AND SUMMARY

Lean-burning engines, or engines that run on an air/fuel mixture with a stoichiometrically greater amount of air than fuel, can offer improved fuel economy relative to engines configured to run on stoichiometric air/fuel mixtures.

However, lean-burning engines also may pose various disadvantages. For example, burning a lean air/fuel mixture may decrease the reduction of nitrogen oxides (collectively referred to as "$NO_x$").

Various mechanisms have therefore been developed to reduce $NO_x$ emissions in lean-burning engines. One mechanism is a catalyst known as a lean $NO_x$ trap. The $NO_x$ trap is a catalytic device typically positioned downstream of the catalytic converter in an emissions system, and is configured to retain $NO_x$ when the engine is producing a lean exhaust for eventual reduction when the engine produces a rich exhaust. A typical $NO_x$ trap includes an alkaline-earth metal, such as barium, and/or an alkali metal, such as potassium, to which $NO_x$ adsorbs when the engine is running a lean air/fuel mixture. The engine can then be configured to produce a rich exhaust containing carbon monoxide, hydrogen gas and various hydrocarbons to reduce the $NO_x$ in the trap, thus decreasing $NO_x$ emissions and purging the trap.

Various methods may be used to determine when a $NO_x$ trap needs to be purged. For example, a $NO_x$ sensor may be used to measure $NO_x$ emissions behind a $NO_x$ trap during lean engine operation. With an estimate of the feedgas $NO_x$ concentration (which is the $NO_x$ contained in exhaust from the engine), the $NO_x$ storage efficiency of the trap can be calculated. This may be used to determine when the storage efficiency of the trap has dropped below a minimum threshold value, and therefore when the trap needs to be purged. However, $NO_x$ sensors typically are expensive, and can significantly increase the cost of the lean aftertreatment system.

The inventors herein have realized that a $NO_x$ storage capacity of a catalytic device such as a $NO_x$ trap may be efficiently and accurately estimated from outputs of exhaust oxygen sensors positioned upstream and downstream of the catalytic device by utilizing a method of operating an engine, wherein one embodiment of the method includes operating the engine at a rich air/fuel ratio for a first interval; adjusting a temperature of the catalytic device to a diagnostic temperature for measuring an oxygen uptake by the catalytic device; operating the engine at a lean air/fuel ratio for a second interval; and adjusting the temperature of the catalytic device to an operating temperature. An oxygen storage capacity of the catalytic device may be measured while at the diagnostic temperature from a difference between the signals from the upstream and downstream oxygen sensors, and a $NO_x$ storage capacity of the catalytic device may be determined from the measured oxygen storage capacity. By performing the diagnostic in the diagnostic temperature range, a more repeatable and robust OSC measurement can be made.

Also, note that a relative air/fuel ratio may be relative to stoichiometry, also referred to as a lambda. Lambda may be a mass ratio of air to fuel for a stoichiometric mixture divided by a mass ratio of air to fuel for the actual mixture being used. Lambda of 1 indicates a stoichiometric mixture; lambda greater than 1 is lean and lambda less than 1 is rich.

DETAILED DESCRIPTION OF THE DEPICTED EMBODIMENTS

Figure 1:
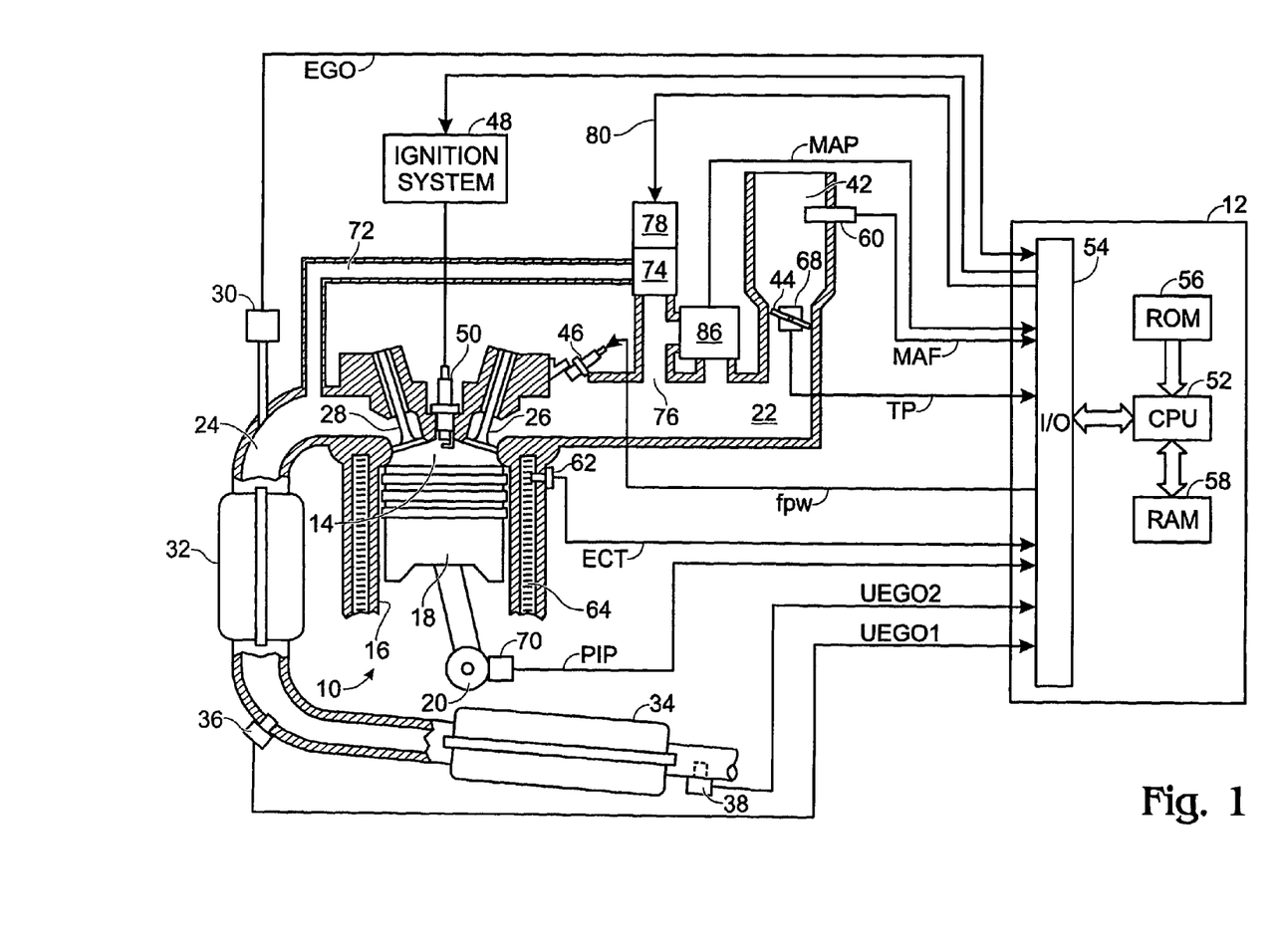
FIG. 1 shows a schematic depiction of an exemplary internal combustion engine.

FIG. 1 shows a schematic depiction of an internal combustion engine 10. Engine 10 typically includes a plurality of cylinders, one of which is shown in FIG. 1, and is controlled by an electronic engine controller 12. Engine 10 includes a combustion chamber 14 and cylinder walls 16 with a piston 18 positioned therein and connected to a crankshaft 20. Combustion chamber 14 communicates with an intake manifold 22 and an exhaust manifold 24 via a respective intake valve 26 and exhaust valve 28. An exhaust gas oxygen sensor 30 is coupled to exhaust manifold 24 of engine 10. A three-way catalyst 32 is connected to and receives feedgas from exhaust manifold 24, and a $NO_x$ trap 34 is connected to and receives emissions from three-way catalyst 32. Furthermore, a first UEGO sensor 36 is positioned between three-way catalyst 32 and $NO_x$ trap 34, and a second UEGO sensor 38 is positioned downstream of $NO_x$ trap 34. Engine 10 is depicted as a port-injection spark-ignition gasoline engine. However, it will be appreciated that the systems and methods disclosed herein may be used with any other suitable engine, including direct-injection engines, and compression ignition engines including but not limited to diesel engines.

Intake manifold 22 communicates with a throttle body 42 via a throttle plate 44. Intake manifold 22 is also shown having a fuel injector 46 coupled thereto for delivering fuel in proportion to the pulse width of signal (fpw) from controller 12. Fuel is delivered to fuel injector 46 by a conventional fuel system (not shown) including a fuel tank, fuel pump, and fuel rail (not shown). Engine 10 further includes a conventional distributorless ignition system 48 to provide an ignition spark to combustion chamber 30 via a spark plug 50 in response to controller 12. In the embodiment described herein, controller 12 is a conventional microcomputer including: a microprocessor unit 52, input/output ports 54, an electronic memory chip 56, which is an electronically programmable memory in this particular example, a random access memory 58, and a conventional data bus.

Controller 12 receives various signals from sensors coupled to engine 10, in addition to those signals previously discussed, including: measurements of inducted mass air flow (MAF) from a mass air flow sensor 60 coupled to throttle body 42; engine coolant temperature (ECT) from a temperature sensor 62 coupled to cooling jacket 64; a measurement of manifold pressure (MAP) from a manifold absolute pressure sensor 66 coupled to intake manifold 22; a measurement of throttle position (TP) from a throttle position sensor 68 coupled to throttle plate 44; and a profile ignition pickup signal (PIP) from a Hall effect sensor 70 coupled to crankshaft 40 indicating an engine speed (N).

Exhaust gas is delivered to intake manifold 22 by a conventional EGR tube 72 communicating with exhaust manifold 24, EGR valve assembly 74, and EGR orifice 76. Alternatively, tube 72 could be an internally routed passage in the engine that communicates between exhaust manifold 24 and intake manifold 22.

Manifold absolute pressure sensor 66 communicates with EGR tube 72 between valve assembly 74 and orifice 76. Manifold absolute pressure sensor 66 also communicates with intake manifold 22. Stated another way, exhaust gas travels from exhaust manifold 24 first through EGR valve assembly 74, then through EGR orifice 76 to intake manifold 22. EGR valve assembly 74 can then be said to be located upstream of orifice 76.

Manifold absolute pressure sensor 66 provides a measurement of manifold pressure (MAP) and pressure drop across EGR valve assembly 74 (DP) to controller 12. Signals MAP and DP are then used to calculate EGR flow. EGR valve assembly 74 has a valve position (not shown) for controlling a variable area restriction in EGR tube 72, which thereby controls EGR flow. EGR valve assembly 74 can either minimally restrict EGR flow through tube 72 or completely restrict EGR flow through tube 72. Vacuum regulator 78 is coupled to EGR valve assembly 74. Vacuum regulator 78 receives actuation signal on line 80 from controller 12 for controlling valve position of EGR valve assembly 74. In a preferred embodiment, EGR valve assembly 74 is a vacuum actuated valve. However, as is obvious to those skilled in the art, any type of flow control valve may be used, such as, for example, an electrical solenoid powered valve or a stepper motor powered valve. Note that alternative EGR systems can also be used, such as those having an orifice upstream of the EGR control valve. Further, systems utilizing a stepper motor valve without an orifice can also be used.

In order for $NO_x$ trap 34 to perform properly, it must be purged of stored $NO_x$ on a periodic basis. As mentioned above, $NO_x$ trap 34 generally is purged when the $NO_x$ storage efficiency of the trap drops below a minimum threshold efficiency. This storage efficiency may be determined by utilizing a $NO_x$ sensor located downstream of the $NO_x$ trap, and comparing a measured $NO_x$ concentration downstream of the $NO_x$ trap to a calculated (or measured) $NO_x$ concentration upstream of the $NO_x$ trap. However, as mentioned above, $NO_x$ sensors are expensive, and their use can raise the cost of an emissions system significantly.

Alternatively, in lieu of using a $NO_x$ sensor located downstream of $NO_x$ trap 34 to help determine the $NO_x$ storage efficiency of the trap, a mathematical model can be used along with estimates of the feedgas $NO_x$ concentration, flow rate, and $NO_x$ trap temperature to estimate the $NO_x$ storage efficiency of the trap as a function of time.

An important input to such a mathematical model is the total $NO_x$ storage capacity of the $NO_x$ trap, since this total $NO_x$ capacity can decrease over the life of the vehicle due to thermal aging effects. The total $NO_x$ storage capacity of the $NO_x$ trap could be estimated by running lean for an extended period of time and using the responses of pre-trap and post-trap HEGO or UEGO sensors to estimate the amount of $NO_x$ released during the subsequent rich purge (after correcting for the delay in the post-trap UEGO due to oxygen release). However, the extended lean period may result in excessive $NO_x$ emissions as the $NO_x$ trap becomes saturated with stored $NO_x$.

Figure 2:
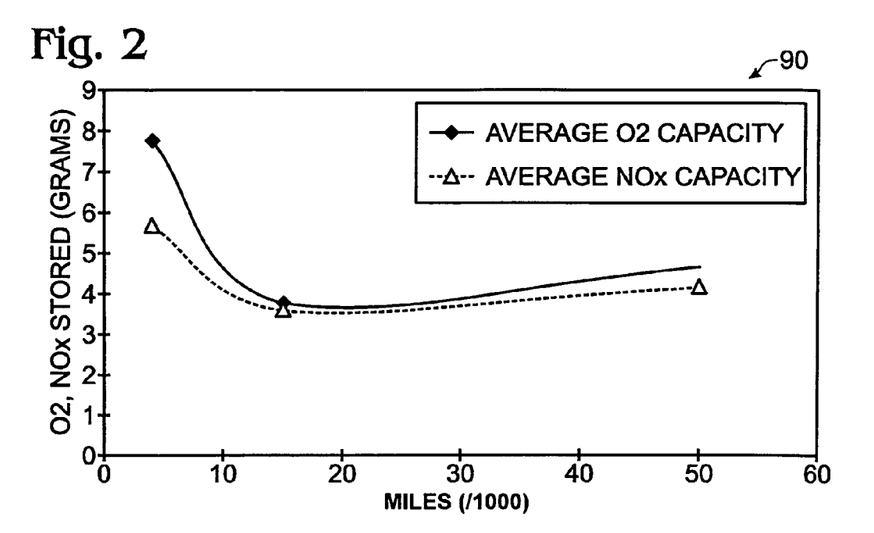
FIG. 2 shows a graphical representation of an average oxygen capacity compared to an average $NO_x$ storage capacity of a $NO_x$ trap as a function of trap aging, measured on a vehicle.
Figure 3:
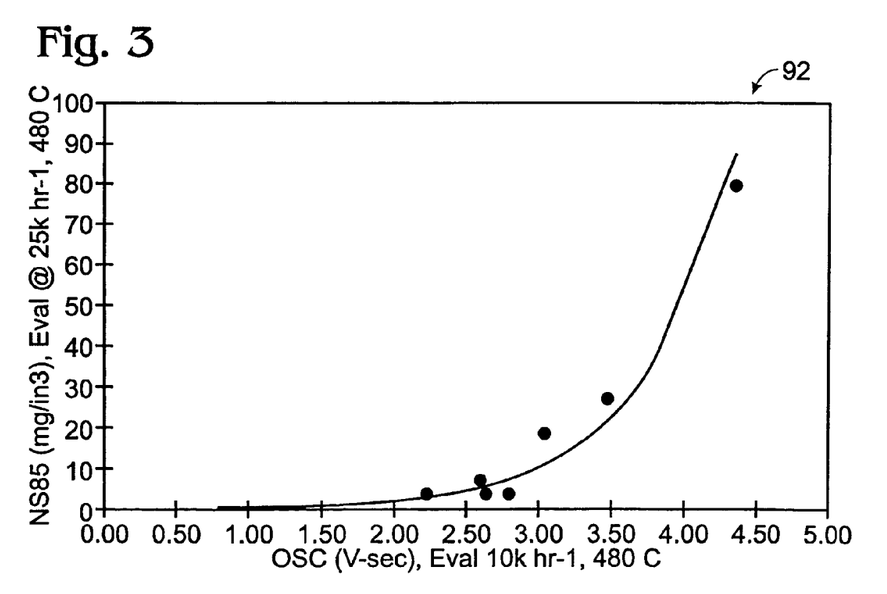
FIG. 3 shows a graphical representation of an average $NO_x$ storage capacity of a $NO_x$ trap as a function of an average oxygen storage capacity for a plurality of trap ages, measured on a laboratory reactor.

To overcome the problems with these methods of estimating the $NO_x$ storage capacity of $NO_x$ trap 34 for the purpose of determining $NO_x$ storage efficiency, an oxygen storage capacity of $NO_x$ trap 34 may be determined and then used to estimate the total $NO_x$ storage capacity of the trap. The oxygen storage capacity may be used to estimate $NO_x$ storage capacity because both reactions are catalyzed by the platinum in the trap. The platinum can coarsen during high temperature operation, particularly under lean conditions, and the grain size of the platinum particles in the $NO_x$ trap can grow under such conditions, as described below. As a result, both the oxygen storage capacity and the total $NO_x$ storage capacity of the LNT decrease with aging. FIG. 2 shows, generally at 90, the measured $NO_x$ storage capacity and oxygen storage capacity of a $NO_x$ trap that was aged on a vehicle up to 50K miles. This plot shows that there is a strong correlation between the $NO_x$ and oxygen storage capacity of the $NO_x$ trap, and therefore that the oxygen storage capacity may be used to estimate the $NO_x$ storage capacity. Likewise, FIG. 3 shows, generally at 92, a plot of the $NO_x$ storage capacity of a $NO_x$ trap as a function of oxygen storage capacity, indicating a strong correlation between the $NO_x$ storage capacity and the oxygen storage capacity of a lean $NO_x$ trap.

The oxygen storage capacity of $NO_x$ trap 34 may be determined in any suitable manner. For example, the oxygen storage capacity of $NO_x$ trap 34 may be determined by comparing signals from first UEGO sensor 36 (or "upstream UEGO sensor") and second UEGO sensor 38 (or "downstream UEGO sensor") during a rich-to-lean transition after a purge period, as the two signals will have different instantaneous magnitudes during this transition due to oxygen uptake by the $NO_x$ trap until the trap saturates with oxygen. The determined oxygen storage capacity may then be used to estimate the total $NO_x$ storage capacity of $NO_x$ trap 34 at any time during the life of the vehicle.

In one embodiment, the comparison of the signals from UEGO sensor 36 and UEGO sensor 38 includes integrating the difference between the two signals during a rich-to-lean transition. The determination of the oxygen storage capacity via subtracting the amount of oxygen exiting the $NO_x$ trap from the quantity of oxygen entering the $NO_x$ trap may be expressed mathematically as follows:

$$O_2 \text{ capacity} = O_{2in} - O_{2out} \quad (1)$$

where the oxygen entering and exiting the $NO_x$ trap are given by $$O_{2in} = (0.232) \int_{\lambda_{FG} \geq 1}^{\lambda_{TP} \geq c(\lambda_{FG})} AM \left( \frac{\lambda_{FG} - 1}{\lambda_{FG}} \right) dt \quad (2)$$

$$O_{2out} = (0.232) \int_{\lambda_{FG} \geq 1}^{\lambda_{TP} \geq c(\lambda_{FG})} AM \left( \frac{\lambda_{TP} - 1}{\lambda_{TP}} \right) dt \quad (3)$$

and wherein AM is the air mass that flows through the engine (measured or calculated), $\lambda_{FG}$ is the relative air/fuel ratio of the feedgas, $\lambda_{TP}$ is the relative air/fuel ratio at the tailpipe, and c is a calibratible multiplier that determines how close the $\lambda_{TP}$ is to $\lambda_{FG}$ when the integration is terminated.

Under rich conditions, the rear UEGO can indicate a richer A/F ratio than the feedgas UEGO due to hydrogen formed over the LNT by the water-gas-shift reaction. To eliminate this effect from the oxygen storage capacity calculations, the tailpipe A/F ratio indicated by the rear UEGO can be "clamped" at the value of the A/F ratio indicated by the feedgas UEGO.

Another factor that can affect the oxygen storage capacity calculations is the transport time between the feedgas UEGO and the tailpipe UEGO. Therefore, a more accurate expression of the oxygen storage capacity calculation that takes into account the exhaust gas transport delay may be expressed as follows:

$$O_{2in} = (0.232) \int_{\lambda_{FG} \geq 1}^{\lambda_{TP} \geq c(\lambda_{FG})} AM\_dly \left( \frac{\lambda_{FG\_dly} - 1}{\lambda_{FG\_dly}} \right) dt \quad (4)$$

$$O_{2out} = (0.232) \int_{\lambda_{FG} \geq 1}^{\lambda_{TP} \geq c(\lambda_{FG})} AM\_dly \left( \frac{\lambda_{TP} - 1}{\lambda_{TP}} \right) dt \quad (5)$$

where the AM_dly is the air mass corrected for the transport delay between the front and rear UEGO sensor, and $\lambda_{FG\_dly}$ is the lambda value of the feedgas exhaust corrected for the transport delay between the front and rear UEGO sensor.

One potential difficulty with determining the oxygen storage capacity by integrating a difference in signals from UEGO sensors 36 and 38 is that, if the relative air/fuel ratio returns to the normal lean relative air/fuel ratio after purging $NO_x$ trap 34 (e.g., a relative air/fuel ratio of 19 to 23 for port fuel injection applications, or a ratio of 30 to 40 for direct injection spark ignition applications, or a ratio of 17 to 100 for diesel engines, or a lambda value of 1.2-1.4 for port fuel injection applications, 1.5 to 3 for stratified charge gasoline applications, and 1.2 to 7 for diesel engines), $NO_x$ trap 34 will saturate with oxygen very quickly due to the high flow rate and the high level of oxygen, particularly after the $NO_x$ trap has been thermally aged. As a result, the integrated measure of the difference between the signals may be rather small, making it difficult to distinguish different degrees of thermal aging.

Therefore, to increase the difference between the UEGO signals and thereby determine the oxygen storage capacity with a greater precision and sensitivity, the relative air/fuel ratio may be first transitioned from a rich ratio to a first, diagnostic lean relative air/fuel ratio, which is less lean than the ordinary operational lean ratio, for a short period of time. This diagnostic lean relative air/fuel ratio may be any desired distance from the stoichiometric point. In general, the closer the diagnostic lean relative air/fuel ratio is to the stoichiometric point, the larger the integrated difference between the UEGO signals. Furthermore, relative air/fuel ratios of approximately 16-17 for gasoline (or about 1.1 lambda) are associated with relatively high $NO_x$ outputs. Therefore, to avoid high $NO_x$ levels, the diagnostic air fuel/ratio may have a value between this $NO_x$ emissions peak and the stoichiometric point (for example, a lambda value of approximately 1) in comparison to the full lean operation, which may be performed at the air-fuel ratios indicated above. It will be appreciated that these ranges are merely exemplary, and that other relative air/fuel ratios outside of these ranges may also be used.

Relative to full lean operation, the use of a period having a slightly lean relative air/fuel ratio will provide a lower oxygen flow rate and concentration during the diagnostic period, thereby causing the difference between the upstream and downstream UEGO sensors to read differently for a longer period of time, and therefore increasing the magnitude of the integrated difference between the signals. This may increase the sensitivity of the oxygen storage capacity measurement. After $NO_x$ trap 34 has saturated with oxygen, the diagnostic period may terminate and the relative air/fuel ratio may then transition to the full lean value for normal engine operation.

Figure 4:
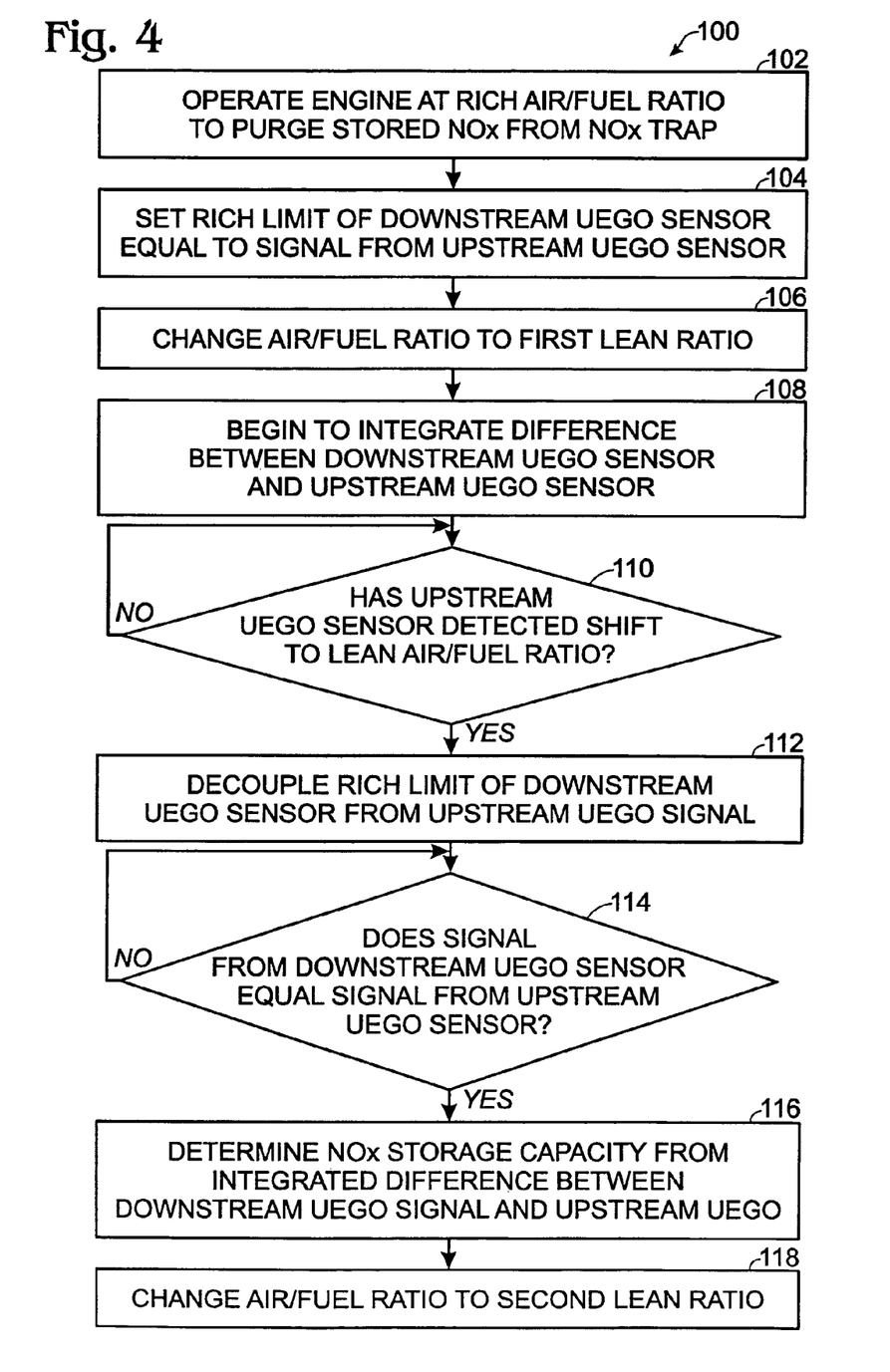
FIG. 4 shows a flow diagram of one exemplary embodiment of a method of determining a $NO_x$ storage capacity of a catalytic device.

FIG. 4 shows, generally at 100, an exemplary embodiment of a method of determining an oxygen storage capacity of a $NO_x$ trap via the use of upstream UEGO sensor 36 and downstream UEGO sensor 38. Method 100 is typically controlled by controller 12, and is performed after an extended period of lean operation when the $NO_x$ storage efficiency of the trap drops below a preselected minimum threshold. It will be appreciated that the order of the steps shown in FIG. 4 is merely exemplary, and that the steps may be performed in any other suitable order or manner.

Referring to FIG. 4, method 100 includes, at 102, operating the engine at a rich relative air/fuel ratio to purge stored $NO_x$ from $NO_x$ trap 34. Next, at 104, method 100 includes setting the rich limit of downstream UEGO sensor 38 to be temporarily equal to the signal from upstream UEGO sensor 36. This prevents downstream UEGO sensor 38 from showing a richer reading than upstream UEGO sensor 36 for the interval when the engine is still running a rich relative air/fuel mixture and oxygen is not being taken up by trap 34. This optional step may be performed to compensate for the water gas shift effect, wherein water vapor in the feedgas reacts with CO in $NO_x$ trap 34 to produce $CO_2$ and hydrogen gas. This hydrogen can cause downstream UEGO sensor 36 to read more rich than upstream UEGO sensor 38 before the engine has made a rich-to-lean transition.

After optionally setting the rich limit of downstream UEGO sensor 38 equal to the signal from upstream UEGO sensor 36, method 100 next includes, at 106 changing the relative air/fuel ratio to a first lean relative air/fuel ratio, wherein the first lean relative air/fuel ratio is less lean than the normal operating relative air/fuel ratio. Method 100 next includes, at 108, beginning to integrate the difference between the signal from downstream UEGO sensor 38 and upstream UEGO sensor 36, and monitoring, at 110, upstream UEGO sensor 36 to determine whether the feedgas has shifted to a lean relative air/fuel ratio. Once upstream UEGO sensor 36 detects a shift to a lean relative air/fuel ratio, the rich limit of downstream UEGO sensor 38 is decoupled, at 112, from the signal from upstream UEGO sensor 36, thereby allowing downstream UEGO detector to detect the richer exhaust caused by the uptake of oxygen by trap 34.

The integration of the difference between the signals continues, as indicated at 114, until the signal from downstream UEGO sensor 38 equals or approximately equals the signal from upstream UEGO sensor 36, indicating that the $NO_x$ trap has saturated with oxygen. After the signal from downstream UEGO sensor 38 equals or approximately equals the signal from upstream UEGO sensor 36, the $NO_x$ storage capacity is determined, at 116, from the integrated difference between the signals from the two UEGO sensors, and the relative air/fuel ratio is changed, at 118, to a second, leaner relative air/fuel ratio for ordinary lean engine operation. The $NO_x$ storage capacity may then be used to calculate the $NO_x$ storage efficiency to help determine when to again purge $NO_x$ trap 34.

Because the first lean relative air/fuel ratio is closer to the stoichiometric point than the second lean relative air/fuel ratio, the amount of oxygen and the space velocity of the exhaust entering $NO_x$ trap 34 are lower at the first lean relative air/fuel ratio than at the second lean relative air/fuel ratio. Therefore, the saturation of $NO_x$ trap 34 with oxygen takes more time at the first lean relative air/fuel ratio than at the second relative air/fuel ratio. This causes the signal from downstream UEGO sensor 38 to read richer than the signal from upstream UEGO sensor 36 for a longer period of time compared to operation at the second lean relative air/fuel ratio, and therefore causes the integral of the difference between the signals to be larger. This leads to greater sensitivity and precision in the measurement, which allows the $NO_x$ storage capacity and $NO_x$ storage efficiency to be determined more accurately.

The $NO_x$ storage capacity may be determined from the integrated difference between the UEGO sensors 36, 38 in any suitable manner. Generally, an estimate of the $NO_x$ storage capacity may be determined according to the following relationships:

$$NO_x\_Cap\_Nominal = \text{Nominal Fresh } NO_x \text{ storage capacity of the } NO_x \text{ trap.} \quad (6)$$

$$O2\_cap\_Nominal = \text{Nominal Fresh Oxygen storage capacity of the } NO_x \text{ trap.} \quad (7)$$

$$O2\_Cap\_Actual = \text{diagnostically determined estimation of the oxygen storage capacity of the } NO_x \text{ trap.} \quad (8)$$

$$O2\_cap\_fraction = O2\_Cap\_Actual / O2\_Cap\_Nominal; \quad (9)$$

$$LNT\_NO_x\_Cap\_Fraction = f(o2\_cap\_fraction) \quad (10)$$

$$NO_x\_Cap\_Actual = NO_x\_cap\_Nominal * LNT\_NO_x\_Cap\_Fraction \quad (11)$$

Since the $NO_x$ storage capacity of the LNT changes with temperature, the foregoing $NO_x$ capacity estimation can be performed at different temperatures while the trap is being purged at different temperatures during operation on a vehicle. These estimated capacities can be stored in a table and used to estimate the $NO_x$ storage efficiencies while the trap is operating at different temperatures. Alternately, the $NO_x$ storage capacity can be determined by this method at one temperature, and the $NO_x$ storage capacities at other temperatures could be estimated from mathematical equations.

Then, the $NO_x$ storage efficiency may be determined from the estimated $NO_x$ storage capacity using variables such as the $NO_x$ trap temperature, the feedgas $NO_x$ flow rate, the exhaust mass flow rate, and constants such as the trap volume, the hydraulic diameter of the exhaust system, the Sherwood number, the $NO_x$ trap geometric surface area, and the ideal gas constant.

Figure 5:
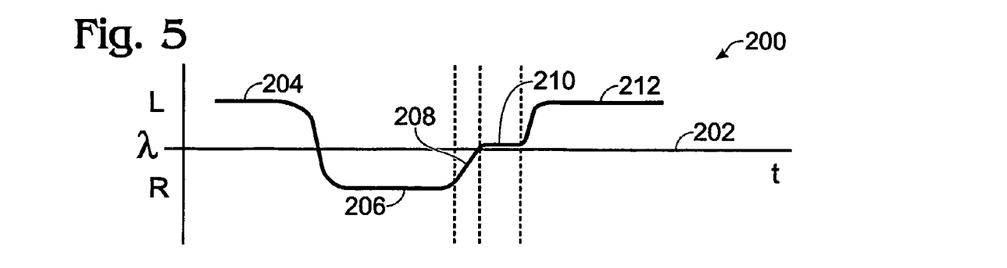
FIG. 5 shows a graphical representation of a stoichiometry of a relative air/fuel ratio as a function of time while operating an internal combustion engine according to the method of FIG. 4.

FIG. 5 shows, generally at 200, a plot of the relative air/fuel ratio as a function of time during the performance of method 100. The stoichiometric point is indicated by line 202, rich relative air/fuel ratios are indicated by the area below line 202, and lean relative air/fuel ratios are indicated by the area above line 202. During normal lean operation, the engine operates at a relative air/fuel ratio spaced at a first distance from the stoichiometric point, as indicated at 204. When a $NO_x$ trap purge cycle is initiated, the relative air/fuel ratio supplied to the engine shifts to a rich relative air/fuel ratio for a sufficient duration to purge the $NO_x$ trap of stored $NO_x$, as indicated at 206. After finishing the purging cycle, the relative air/fuel ratio is transitioned to a diagnostic relative air/fuel ratio spaced more closely to the stoichiometric point than the ordinary operating lean ratio. This transition is indicated at 208. During this transition, the integration of the difference between the outputs from upstream UEGO sensor 36 and downstream UEGO sensor 38 may begin. Furthermore, the rich limit of downstream UEGO sensor 38 may be set to read no more rich than the upstream UEGO sensor 36 (as described at 104 in FIG. 4) for this transition to avoid integration errors due to water gas shift. After the relative air/fuel ratio crosses the stoichiometric point, upstream UEGO sensor 36 may detect the transition to a lean relative air/fuel ratio, and the rich limit of downstream UEGO sensor 38 may be decoupled from the output of upstream UEGO sensor 36.

Next, the relative air/fuel ratio is held at the diagnostic relative air/fuel ratio while the integration of the difference between the signals from upstream UEGO sensor 36 and downstream UEGO sensor 38 occurs. This phase of operation is indicated in FIG. 5 at 210, and continues until the signal from downstream UEGO sensor 38 is equal to or substantially equal to the signal from upstream UEGO sensor 36, indicating that $NO_x$ trap 34 is saturated with oxygen. At this point, the relative air/fuel ratio returns to the ordinary operating lean relative air/fuel ratio, as indicated at 212.

Figure 6:
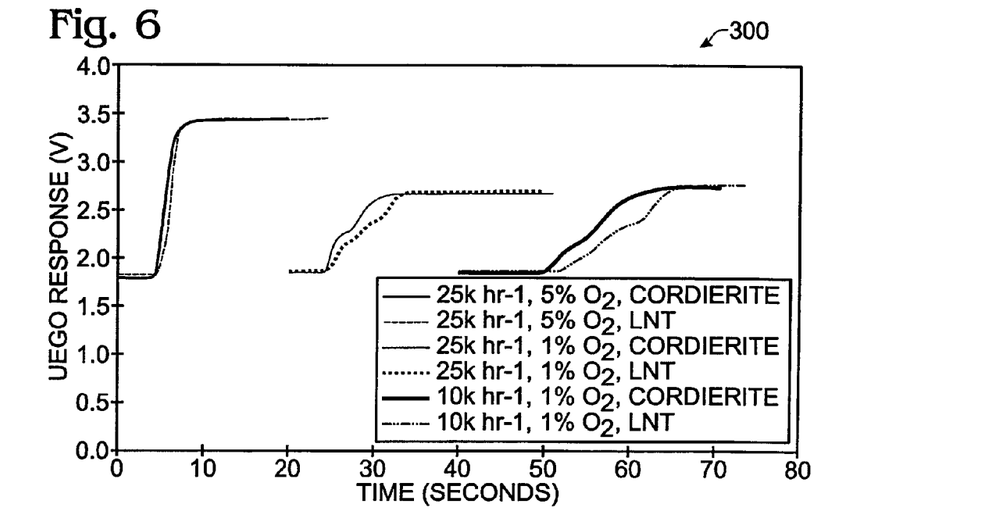
FIG. 6 shows a graphical representation of a signal from an oxygen sensor located downstream of a $NO_x$ trap compared to a reference signal as a function of time for a plurality of feedgas oxygen concentrations and space velocities.

FIG. 6 shows, generally at 300, a plot of the responses from UEGO sensors positioned downstream of a fresh $NO_x$ trap and downstream of an uncoated cordierite catalyst support blank, which is used to simulate the response of a UEGO sensor positioned upstream of the $NO_x$ trap. The plots are shown for three different experimental conditions: 25 k hr$^{-1}$ space velocity and 5% $O_2$ concentration; 25 k hr$^{-1}$ space velocity and 1% $O_2$ concentration; and 10 k hr$^{-1}$ space velocity and 1% $O_2$ concentration. The plots are shown as a UEGO response in volts vs. time. The area between the curves for each set of data corresponds to the integrated difference between the upstream and downstream UEGO sensors, and is measured in volt-seconds. As shown in FIG. 6, this area increases as the space velocity drops and as the $O_2$ concentration drops. Therefore, a larger integrated difference measurement, and thus a more sensitive determination of the oxygen storage capacity of the $NO_x$ trap, can be obtained by decreasing the space velocity and/or the oxygen concentration in the feedgas entering the $NO_x$ trap. The larger integrated difference measurements may allow a better differentiation of lean $NO_x$ traps that have been exposed to different degrees of thermal aging.

Figure 7:
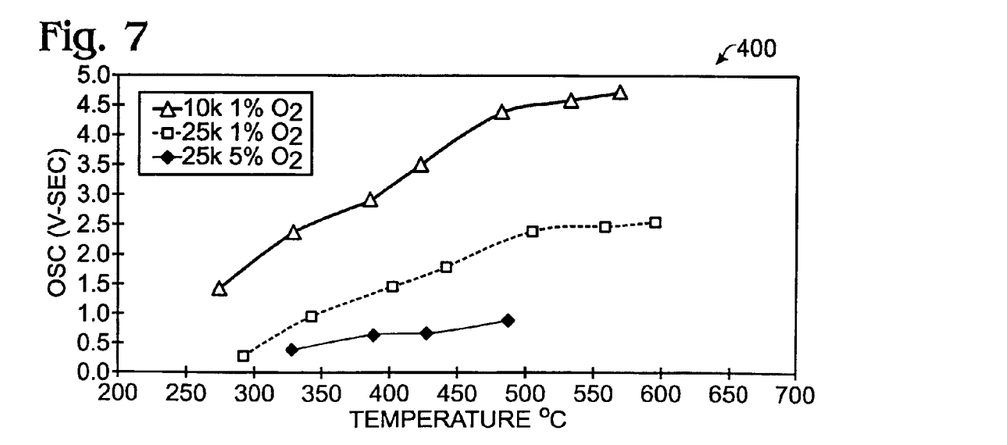
FIG. 7 shows a graphical representation of the integrated differences between the signals from an oxygen sensor located downstream of a $NO_x$ trap and a reference signal as a function of temperature for a plurality of feedgas oxygen concentrations and space velocities.

Next, FIG. 7 shows, generally at 400, a plot of the integrated differences between the two UEGO sensors (in volt-seconds) as a function of the $NO_x$ trap temperature for the oxygen concentration and space velocity conditions used in the experiment of FIG. 6. As can be seen from the plot, the integrated values of the differences between the UEGO signals with 10 k and 1% are over four times larger than the measured values at 25 k and 5% $O_2$. Furthermore, it can also be seen that the integrated values of the differences between the UEGO signals were found to increase with increasing temperature, suggesting that the temperature needs to be taken into account when using these measurements to predict the $NO_x$ storage capacity of $NO_x$ trap 34.

Figure 8:
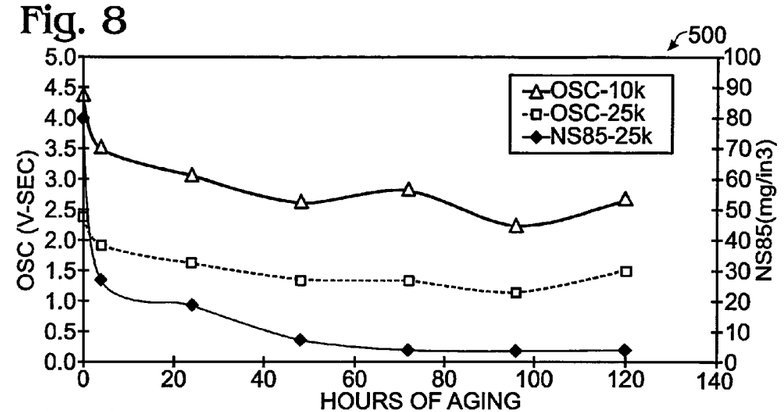
FIG. 8 shows a graphical representation of measured $NO_x$ trap oxygen storage capacities and $NO_x$ storage capacities as a function of trap aging, measured on a laboratory reactor.

FIG. 8 shows, generally at 500, a plot of the results of an experiment in which a core sample of a three-way catalyst was aged on a pulse-flame combustion reactor for 120 hours at an inlet temperature of 850° C. with stoichiometric exhaust, and a core sample of a lean $NO_x$ trap was aged behind the three-way catalyst at an inlet temperature of 800° C. Plot 400 shows the measured values of the integrated difference between the UEGO sensors at conditions of 10 k $hr^{-1}$ space velocity and 1% $O_2$, and 25 k $hr^{-1}$ space velocity and 1% $O_2$, as well as the measured $NO_x$ storage capacity of the lean $NO_x$ trap at various test points during the 120 hours of aging. The $NO_x$ storage capacity reported is the amount of $NO_x$ stored with a final efficiency of 85% at 25 k $hr^{-1}$, symbolized by "NS85." Both the $NO_x$ storage capacity and integrated difference between the UEGO sensors were measured at a temperature near 480° C. From the plot, it can be seen that both the $NO_x$ storage capacity and the OSC of the LNT dropped rapidly during the early stages of aging, and then at a slower rate as the aging proceeded out to the 120 hours. This plot also shows both that the $NO_x$ storage capacity is highly correlated with the measured difference between the UEGO signals throughout the aging process, and that the lower space velocity measurements of the UEGO signal differences demonstrate a greater amplitude, and therefore a greater sensitivity, than the higher space velocity measurements of the UEGO signal differences throughout the aging process.

Figure 9:
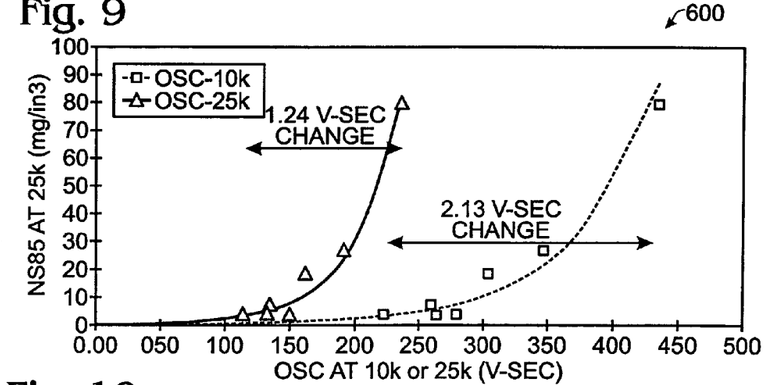
FIG. 9 shows a graphical representation of a change in $NO_x$ storage capacity compared to a change in an oxygen storage capacity measurement for two different exhaust gas space velocities, measured on a laboratory reactor.

FIG. 9 shows, generally at 600, a plot of the NS85 versus the integrated difference between the UEGO signals at both 10 k and 25 k $hr^{-1}$ space velocities, an oxygen level of 1%, and a temperature of 480° C. For the 25 k $hr^{-1}$ space velocity, the change in the OSC during the 120 hours of aging was around 1.24 Volt-second, whereas the change was near 2.13 Volt-second for the 10 k $hr^{-1}$ space velocity. The lower space velocity increased both the magnitude of the integrated UEGO difference measurement, and the magnitude of the change in the integrated UEGO difference measurement, during the aging. This further indicates that measuring the difference between the signals from upstream UEGO sensor 36 and downstream UEGO sensor 38 at lower space velocities and lower oxygen concentrations helps to increase the magnitude of the measured difference between these signals, and thereby permits a better discrimination between traps with different thermal aging histories.

Figure 10:
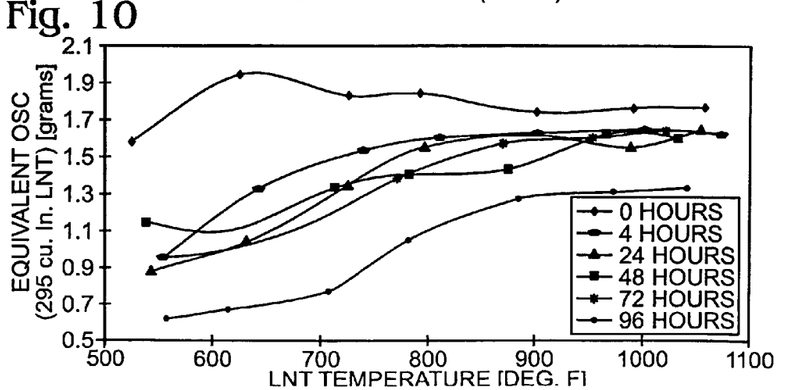
FIG. 10 shows a graphical representation of a plurality of measured $NO_x$ trap oxygen storage capacities as a function of temperature and of trap aging.

FIG. 10 shows, generally at 700, a graphical representation of the measured oxygen storage capacity of a $NO_x$ trap as a function of temperature over a range of $NO_x$ trap aging conditions. The aging time stated for each data set reflects the number of hours the trap was aged on the pulse-flame combustion reactor at 800 degrees Celsius. As is evident in FIG. 10, the differences between the measured oxygen storage capacities of the $NO_x$ trap at different aging conditions are greater at temperatures of between approximately 600 degrees Fahrenheit and 700 degrees Fahrenheit than at higher temperatures. Therefore, in some embodiments, the temperature of a $NO_x$ trap may be changed to a temperature within this range or window before measuring the oxygen uptake of the $NO_x$ trap when determining the $NO_x$ storage capacity and efficiency of the $NO_x$ trap to obtain a more sensitive measurement.

FIG. 10 also indicates that the OSC of the $NO_x$ trap reaches a consistent value at temperatures above approximately 900 degrees Fahrenheit. As a result, the measurement of the OSC may be more reproducible and less sensitive to temperature fluctuations at temperatures above 900 degrees Fahrenheit. Therefore, in some embodiments, the temperature of the $NO_x$ trap may be changed to a temperature above this temperature before measuring the oxygen uptake of the $NO_x$ trap when determining the $NO_x$ storage capacity and efficiency of the $NO_x$ trap in order to obtain a more reproducible and robust measurement. This can be particularly useful on a vehicle during transient driving conditions due to fluctuations in the exhaust temperatures.

Figure 11:
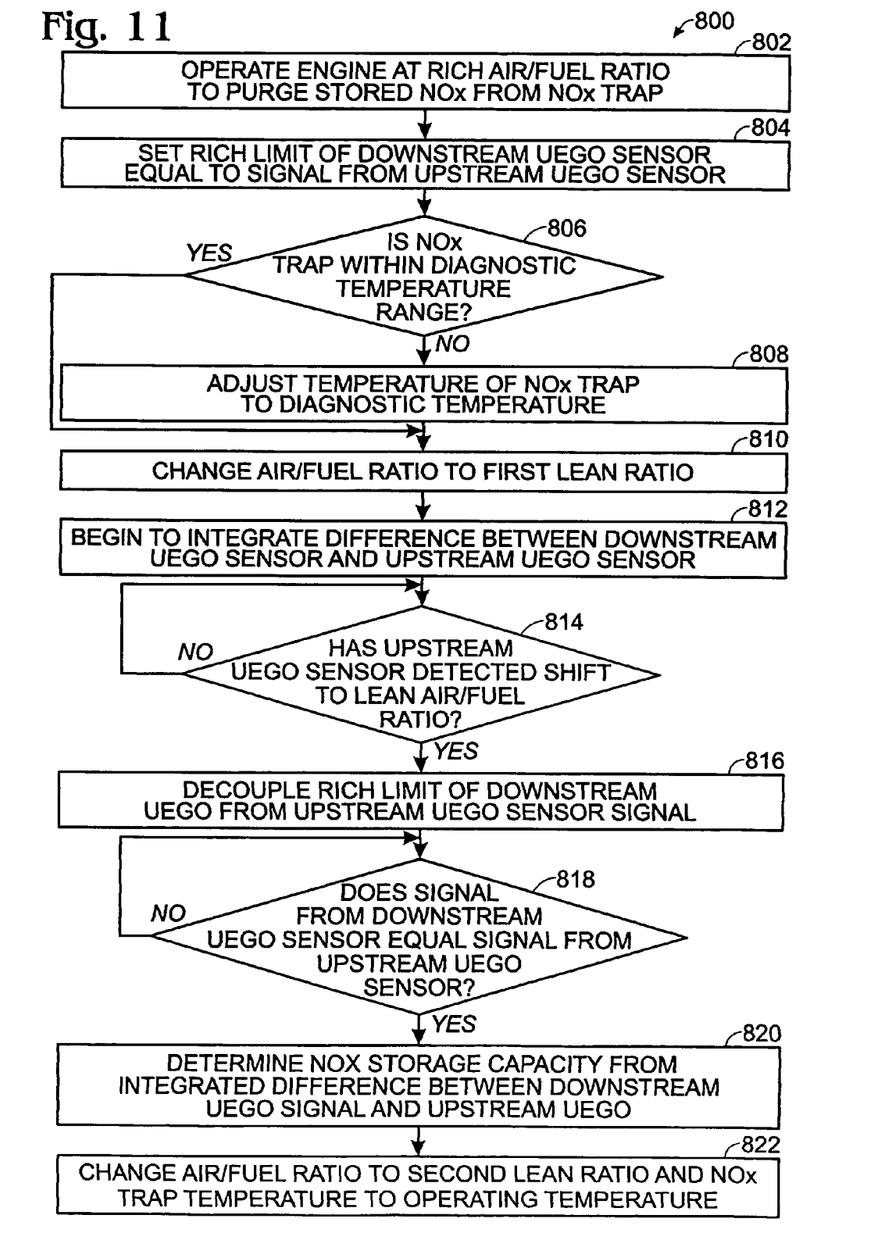
FIG. 11 shows a flow diagram of another exemplary embodiment of a method of determining a $NO_x$ storage capacity of a catalytic device.

FIG. 11 shows, generally at 800, an exemplary embodiment of a method of determining an oxygen storage capacity of a $NO_x$ trap that utilizes this temperature window to obtain a more sensitive oxygen storage measurement. It will be appreciated that the order of the steps shown in FIG. 11 is merely exemplary, and that the steps may be performed in any other suitable order. Method 800 first includes, at 802, operating the engine at a rich relative air/fuel ratio to purge stored $NO_x$ from $NO_x$ trap 34. As described above in the context of method 100, this step is typically performed once it is determined that the $NO_x$ storage efficiency of $NO_x$ trap 34 has fallen below a predetermined minimum threshold. At any time during (or after) this process, the downstream UEGO sensor 38 may be set, at 804, to read no more rich than upstream UEGO sensor 36 to avoid measurement problems arising from the water-gas shift reaction.

Next, method 800 includes, at 806, determining whether $NO_x$ trap 34 is within a desired diagnostic temperature range. The temperature may be measured directly via a temperature sensor (not shown) associated with $NO_x$ trap 34, or may be determined indirectly from engine variables. Likewise, the diagnostic temperature range may encompass any desired range of temperatures, and may or may not have a lower limit (i.e. may be just a single threshold temperature). One exemplary diagnostic temperature range includes temperatures above approximately 400 degrees Celsius. Another exemplary diagnostic temperature range includes temperatures of between approximately 400 and 700 degrees Celsius. Another exemplary diagnostic temperature range includes temperatures between approximately 600 and 700 degrees Celsius. Yet another exemplary diagnostic temperature range includes temperatures greater than approximately 600 degrees Celsius. It will be appreciated that these ranges are set forth merely for the purpose of example, and are not intended to be limiting in any sense.

Next, if it is determined at 806 that the $NO_x$ trap temperature is within the diagnostic range, then method 800 next includes changing, at 810, the relative air/fuel ratio to the first lean ratio, and proceeding from there in the manner described above for method 100. On the other hand, if it is determined at 806 that the $NO_x$ trap temperature is not within the diagnostic range, then method 800 includes adjusting, at 808, the temperature of $NO_x$ trap 34 to a temperature within the diagnostic temperature range (or below a diagnostic temperature threshold) before changing the relative air/fuel ratio to the first lean ratio. Adjusting the temperature of the $NO_x$ trap may include either raising or lowering the $NO_x$ trap temperature, depending upon the temperature of the $NO_x$ trap relative to the diagnostic temperature range. Alternatively, where the temperature of the trap is not within the diagnostic temperature range, the oxygen storage capacity diagnostic may be deferred until a $NO_x$ trap purge is performed that falls within the desired diagnostic temperature.

After adjusting the temperature of the $NO_x$ trap to the a temperature within the diagnostic temperature range, method 800 next includes changing the relative air/fuel ratio to the first lean ratio at 810 and then proceeding in the manner described above for method 100. Specifically, method 800 includes beginning to integrate, at 812, the difference between the signals from upstream UEGO sensor 36 and downstream UEGO sensor 38, and determining, at 814, whether upstream UEGO sensor 36 has detected a shift to a lean feedgas relative air/fuel ratio. Once upstream UEGO sensor 36 detects the shift to the lean feedgas relative air/fuel ratio, the rich limit of downstream UEGO 38 sensor is decoupled, at 816, from upstream UEGO sensor 36, and integration of the difference between the two signals continues until it is determined, at 818, that the signal from downstream UEGO sensor 38 is equal to or substantially equal to the signal from upstream UEGO sensor 36.

Once it is determined that the signal from downstream UEGO sensor 38 is equal to or substantially equal to the signal from upstream UEGO sensor 36, method 800 next includes determining, at 820, the $NO_x$ storage capacity from the integrated difference between the signals from upstream UEGO sensor 36 and downstream UEGO sensor 38, and changing, at 822 the relative air/fuel ratio to the second lean ratio (which may be the ordinary lean operating relative air/fuel ratio) and the catalyst temperature to the operating temperature for optimal performance.

It will be appreciated that the difference in oxygen capacity within the diagnostic temperature range (or at the diagnostic temperature) may be large enough that the sensitivity of the oxygen storage capacity measurement is sufficient even without running the engine at the first lean ratio while integrating the difference between the upstream and downstream UEGO sensors. Therefore, in some embodiments in which the $NO_x$ trap temperature is adjusted to a diagnostic temperature before performing the integration, the first lean ratio may be omitted, and the engine may change from the rich relative air/fuel ratio used for the $NO_x$ trap purge substantially directly to the ordinary lean operating ratio for the integration of the difference between the UEGO sensors.

The methods described herein may be performed without creating undesirable levels of $NO_x$, hydrocarbon, CO, or other undesirable emissions. While operating at the diagnostic relative air/fuel ratio, the oxygen storage capacity of the trap can adsorb the excess oxygen and allow the catalyst to continue converting $NO_x$ under the slightly lean conditions for the duration of the diagnostic. Likewise, the LNT will also be able to effectively oxidize the hydrocarbons and CO under the diagnostic lean conditions.

The embodiments described herein offer several advantages over other methods of estimating oxygen and $NO_x$ storage capacity in catalytic devices. For example, the $NO_x$ absorption model used in a vehicle to determine when regeneration of a $NO_x$ trap is needed may be adjusted for aging effects by using the oxygen storage capacity measurement to estimate the total $NO_x$ storage capacity of the $NO_x$ trap. Additionally, an accurate $NO_x$ storage capacity and storage efficiency model which reflects aging effects may allow the elimination of $NO_x$ sensors and optimally size the $NO_x$ trap to keep aftertreatment system cost low. Furthermore, by performing the oxygen storage capacity diagnostic under conditions of low flow, low oxygen concentration, and/or within in a diagnostic temperature window of higher oxygen storage, the magnitude of the integral of the difference between the upstream and downstream UEGO sensors is increased. This enables a better differentiation between $NO_x$ traps with different degrees of thermal aging.

While the embodiments described above measure the difference between upstream UEGO sensor 36 and downstream UEGO sensor 38 at a rich-to-lean transition, the differences between the sensors at a lean-to-rich transition may also be used to estimate a $NO_x$ storage capacity of $NO_x$ trap 34, for example, during a rich purge of $NO_x$ trap 34. In this case, the integrated difference between the UEGO sensors would give a measurement of the regeneration of the $NO_x$ and oxygen storage sites in the trap. However, both $NO_x$ and oxygen stored on the trap during the previous lean period will be released and react with the reductants in the feedgas to make the tailpipe A/F ratio leaner than the feedgas A/F ratio. Therefore, the signal from downstream UEGO sensor 38 is affected by both the stored $NO_x$ and the stored oxygen during this lean-to-rich transition, as opposed to the rich-to-lean transition in which only stored oxygen affects the signal. To overcome this effect, the $NO_x$ trap could first be exposed to a rich cycle at a first rich relative air/fuel ratio for a first diagnostic period, and the difference between the UEGO sensors could be integrated. The trap could then be exposed to a second rich exhaust to complete the purge of the trap. The trap could then be exposed to lean exhaust for sufficient time to saturate with oxygen. After saturation, the $NO_x$ trap could be exposed to the first rich relative air/fuel ratio a second time for a second diagnostic period, and the difference in UEGO sensors could be integrated again. The integrated difference from the second diagnostic period could be subtracted from the integrated difference from the first diagnostic period to determine the $NO_x$ storage capacity of the LNT. After the second diagnostic period, the relative air/fuel ratio could return to the lean relative air/fuel ratio again.

Figure 12:
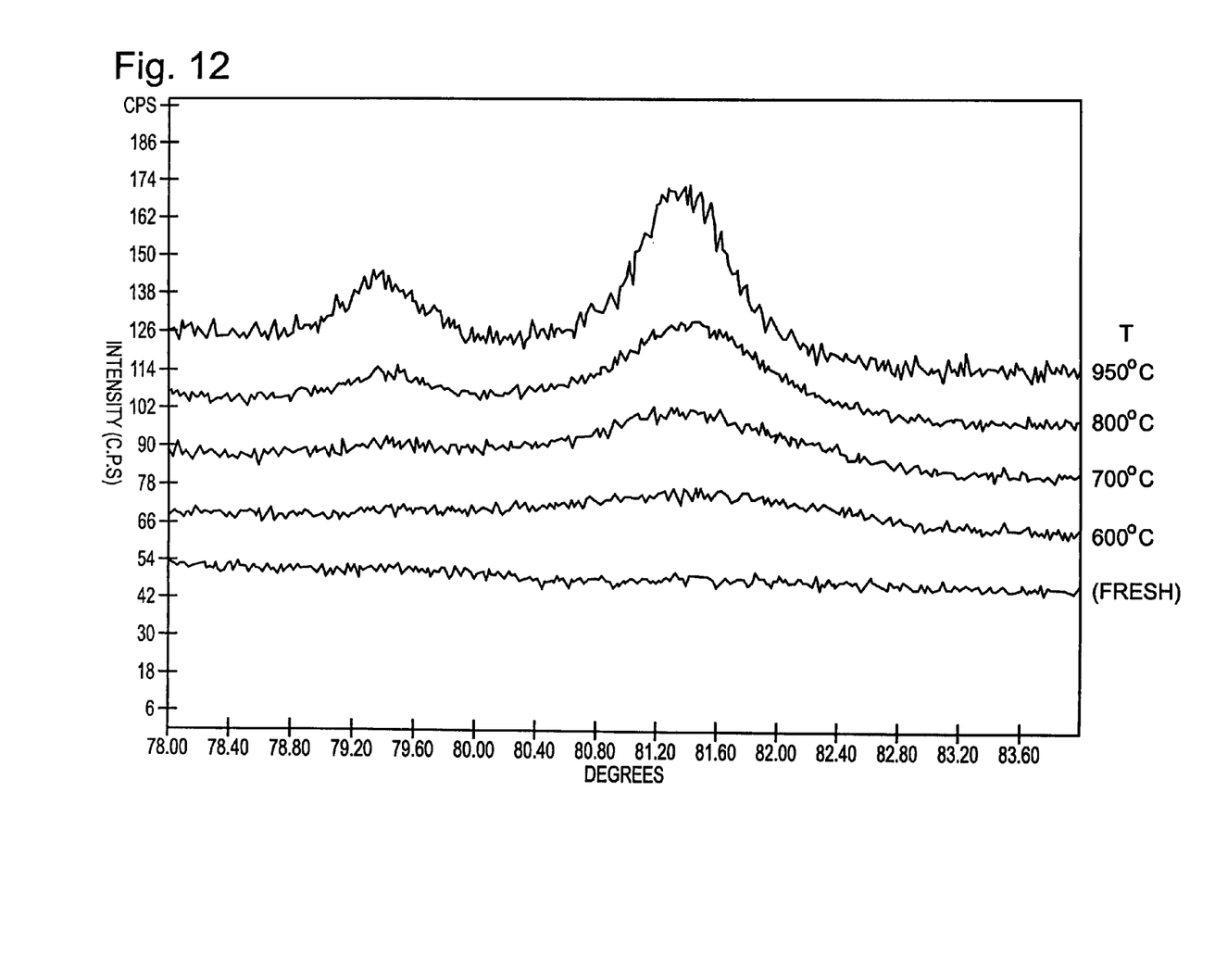
FIG. 12 shows a graphical representation of a change in a platinum [311] x-ray diffraction peak intensity as a function of $NO_x$ trap aging temperature.
Figure 13:
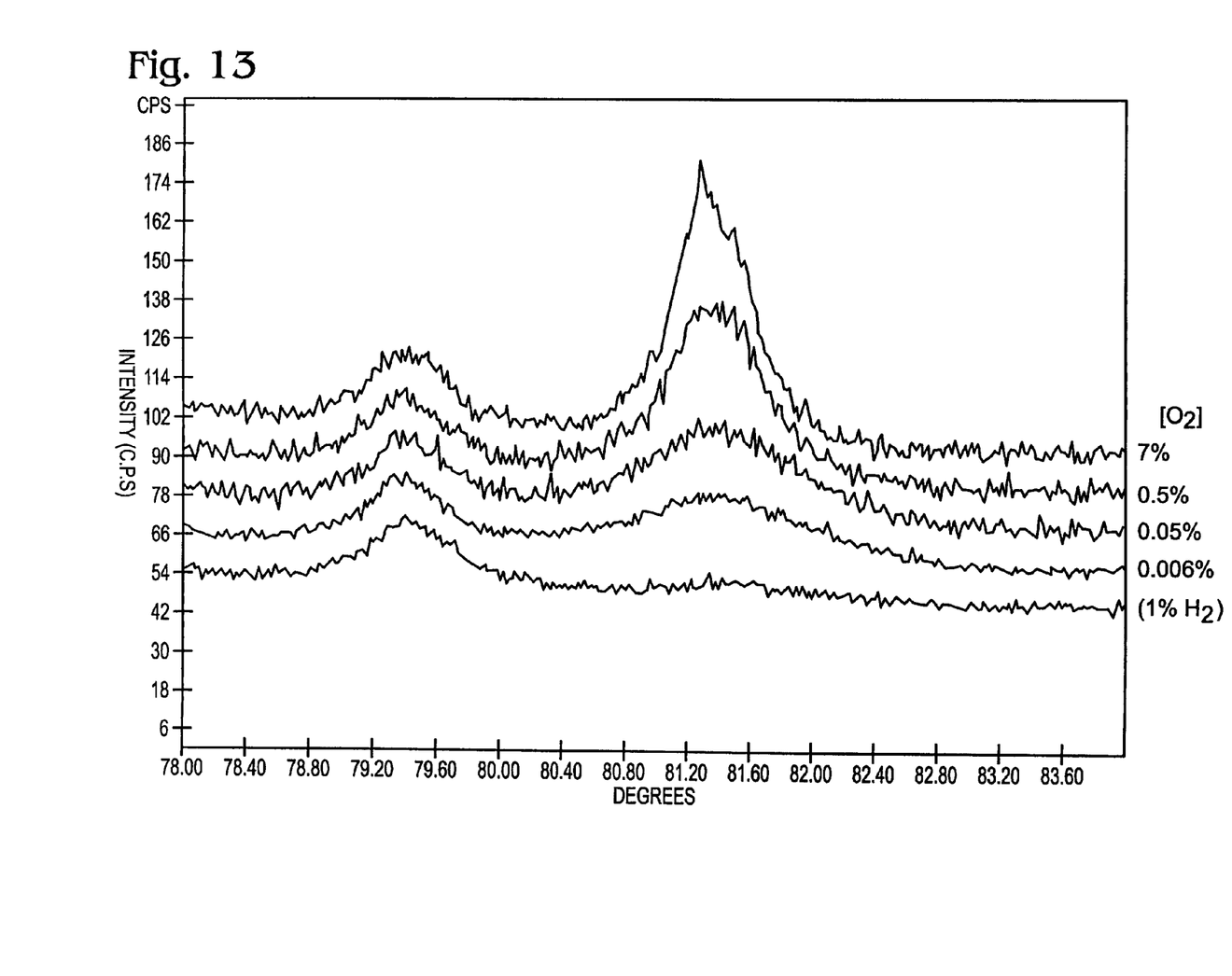
FIG. 13 shows a graphical representation of a change in a platinum [311] x-ray diffraction peak intensity as a function of oxygen concentration during thermal aging of a $NO_x$ trap.

As described above, thermal aging of a $NO_x$ trap can cause morphological changes to the platinum grains in the $NO_x$, which can contribute to a reduction in the storage capacity of the trap. Referring briefly to FIG. 10, it can be seen that the oxygen storage capacity of the $NO_x$ trap decreases with trap aging. Powder x-ray diffraction studies of the constituent components of $NO_x$ traps have shown that both the crystallinity and the grain size of the platinum particles in the $NO_x$ trap increase with increasing aging temperature. FIG. 12 shows the powder x-ray diffraction pattern of the [311] platinum peak (at approximately 81.4 degrees) from platinum taken from a model catalyst of 2% platinum by weight on a high surface-area $BaO/Al_2O_3$ support aged at different temperatures. In this figure, it can be seen that the intensity and sharpness of the peak increases with increasing aging temperature, indicating that aging increases the size and crystallinity of the platinum particles in the sample. Together, these figures indicate that the oxygen storage capacity of a $NO_x$ trap varies inversely with the particle size of the platinum in the trap. Without wishing to be bound by theory, this may be because the storage kinetics of cerium (or other oxygen storage component) and barium (or other $NO_x$ storage component) in the trap are dependent upon the proximity of the barium and cerium surfaces to the catalytic platinum surfaces. As the platinum grain size grows, much of the platinum surface grows farther away from adjacent barium and cerium particles. Similarly, the crystallinity and size of the platinum grains has also been found to increase with increasing oxygen concentration in the catalyst feedgas at high temperatures, as shown in FIG. 13.

Figure 14:
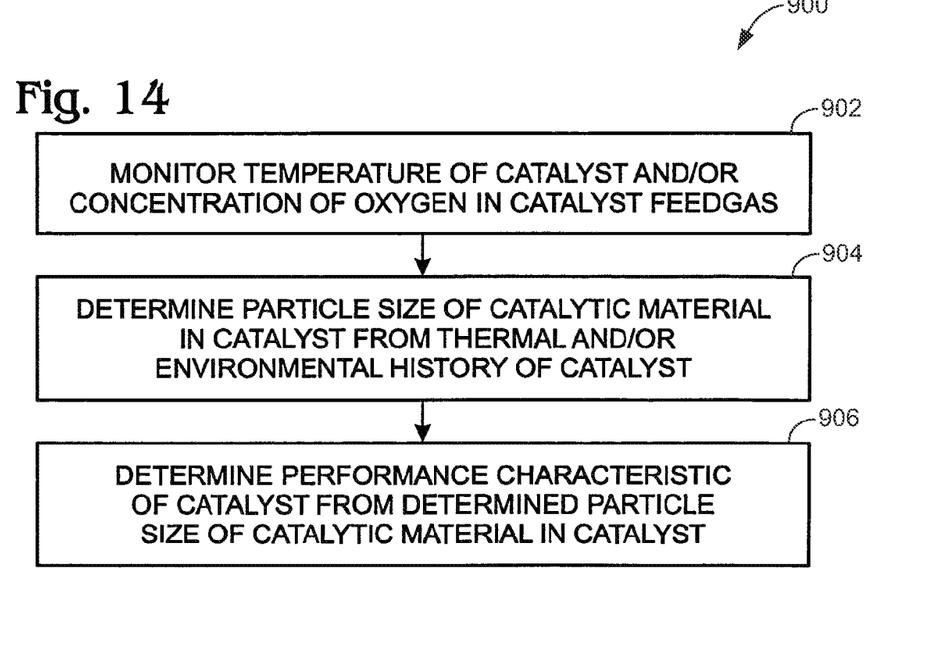
FIG. 14 shows a flow diagram of an exemplary embodiment of a method of determining a performance characteristic of a catalytic device.

The correlation between the catalyst aging temperature, catalyst aging environment (for example, feedgas oxygen concentration) and catalyst oxygen/$NO_x$ storage capacity may allow performance characteristics of a $NO_x$ trap or other catalytic device to be determined by monitoring the aging of the catalytic device and modeling changes in the particle size of the constituent components of the catalytic device to determine changes in the device storage capacity, etc. FIG. 14 shows one exemplary embodiment of such a method, generally at 900. Method 900 includes monitoring the temperature, feedgas composition, and/or other variable related to the aging of the catalytic device at 902, and then determining a particle size of a catalytic material in the catalytic device at 904 from the thermal, environmental, or other operating history of the catalytic device. Next, at 906, a performance characteristic is determined from the determined particle size of the catalytic material. Method 900 thereby allows one or more physical and/or performance characteristics of the catalytic device to be monitored and modeled over time as a function of the morphology of the particles within the catalyst, thus allowing more efficient use of the catalytic device over the lifetime of the device.

In the specific example of a $NO_x$ trap, the catalytic material may be platinum, and the performance characteristic may be oxygen storage capacity, $NO_x$ storage capacity, or any other suitable performance characteristic that may be correlated with $NO_x$ trap performance. In some embodiments, the performance characteristic may be determined from a look-up table stored in memory on controller 12, via a mathematical relationship between the performance characteristic and the determined particle size, or in any other suitable manner.

While the disclosed systems and methods are described herein in the context of a $NO_x$ trap, it will be appreciated that the disclosed systems and methods may be employed to determine an oxygen storage capacity of any other suitable catalytic device, as well as a storage capacity of any other gas besides oxygen that can be correlated to a storage capacity of $NO_x$. Furthermore, while the depicted embodiments are shown and described in the context of a gasoline engine and $NO_x$ trap, it will be appreciated that the concepts may also be extended to a diesel engine and associated $NO_x$ trap (or other suitable catalytic device).

It will be appreciated that the embodiments of systems and methods of determining an oxygen storage capacity and a $NO_x$ storage capacity disclosed herein are merely exemplary in nature, and that these specific embodiments are not to be considered in a limiting sense, because numerous variations are possible. The subject matter of the present disclosure includes all novel and non-obvious combinations and subcombinations of the various relative air/fuel ratio modulation, oxygen storage capacity determinations, space velocities, oxygen feedgas concentrations, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the reaction conditions, modulation frequencies, species determination methods, saturation estimate methods, and/or other features, functions, elements, and/or properties may be claimed through amendment of the present claims in this or a related application. Such claims, whether broader, narrower, equal, or different in scope to the original claims, also are regarded as included within the subject matter of the present disclosure.

What is claimed is:

1. In an apparatus having an internal combustion engine and a NOx trap for treating emissions from the engine, a method of determining an oxygen storage capacity of the NOx trap, comprising:
    flowing exhaust gas from the internal combustion engine to the NOx trap; and
    purging the NOx trap based on a NOx storage capacity, where the NOx storage capacity is determined by:
        monitoring at least one of a thermal history and an ambient environmental history of the NOx trap;
        determining a particle size of a particulate component of the NOx trap from at least one of the thermal history and the ambient environmental history of the NOx trap;
        determining the oxygen storage capacity of the NOx trap, the oxygen storage capacity being inversely related to the particle size; and
    estimating a NOx storage capacity from the oxygen storage capacity.

2. The method of claim 1, wherein the particulate component includes platinum.

3. The method of claim 1, where estimating the NOx storage capacity includes correlating a decrease in oxygen storage capacity with a decrease in NOx storage capacity.

4. The method of claim 1, further comprising calculating a NOx storage efficiency from the NOx storage capacity to determine when to purge the NOx trap.

5. A method for an engine with a NOx trap, comprising:
    flowing exhaust gas through the NOx trap to store NOx;
    determining a platinum particle size of the NOx trap from a thermal history and an ambient environmental history of the NOx trap;
    determining a change in oxygen storage capacity of the NOx trap that varies inversely with the platinum particle size;
    determining a change in NOx storage capacity of the NOx trap based on the change in the oxygen storage capacity; and
    purging the NOx trap of stored NOx based on the determined NOx storage capacity change.

6. The method of claim 5, where determining the change in NOx storage capacity includes correlating a decrease in oxygen storage capacity with a decrease in NOx storage capacity.

7. The method of claim 5, further comprising calculating a change in NOx storage efficiency from the change in NOx storage capacity to determine when to purge the NOx trap.

8. A method for an engine with an exhaust NOx trap, comprising:
    flowing exhaust gas through the NOx trap to store NOx;
    monitoring a thermal history over time and an ambient environmental history of the NOx trap over time, the ambient environmental history including oxygen concentration;
    determining a change in particle size of a particulate component of the NOx trap from the thermal history and the ambient environmental history of the NOx trap;
    determining a change in oxygen storage capacity of the NOx trap, the change in oxygen storage capacity being inversely related to the particle size;
    determining a change in NOx storage capacity of the NOx trap based on the change in oxygen storage capacity; and
    purging the NOx trap of stored NOx based on the determined NOx storage capacity change.

9. The method of claim 8, wherein the particulate component includes platinum.

10. The method of claim 8, where determining the change in NOx storage capacity includes correlating a decrease in oxygen storage capacity with a decrease in NOx storage capacity.

11. The method of claim 8, further comprising calculating a change in NOx storage efficiency from the change in NOx storage capacity to determine when to purge the NOx trap.

* * * * *